(12) United States Patent
Hewitt

(10) Patent No.: US 6,405,585 B1
(45) Date of Patent: Jun. 18, 2002

(54) PORTABLE FLYWHEEL TEST ASSEMBLY

(76) Inventor: Stanley J. Hewitt, 926 West St., Bristow, IA (US) 50611

( * ) Notice: Subject to any disclaimer, the term of this patent is extended or adjusted under 35 U.S.C. 154(b) by 0 days.

(21) Appl. No.: 09/454,160

(22) Filed: Nov. 15, 1999

Related U.S. Application Data

(60) Provisional application No. 60/108,929, filed on Nov. 16, 1998.

(51) Int. Cl.[7] ............................................. G01M 15/00
(52) U.S. Cl. ....................................................... 73/116
(58) Field of Search ............................. 73/116, 117.1, 73/117.2, 117.3, 118.1, 119 R

(56) References Cited

U.S. PATENT DOCUMENTS

| | | | |
|---|---|---|---|
| 1,445,923 A | 2/1923 | Wilder | |
| 2,563,153 A | 8/1951 | Britt | |
| 3,146,619 A | 9/1964 | Sinclair et al. | |
| 3,789,659 A | 2/1974 | Haldeman | |
| 4,084,428 A | 4/1978 | Ahn et al. | |
| 4,457,165 A | 7/1984 | Wiederrich | |
| 4,466,294 A | 8/1984 | Bennington et al. | |
| 4,483,184 A | 11/1984 | Knuzfeld | |
| 4,688,419 A | 8/1987 | D'Angelo et al. | |
| 5,060,176 A | 10/1991 | Nawa et al. | |
| 5,429,004 A | 7/1995 | Cruickshank | |
| D366,433 S | 1/1996 | Evans et al. | |
| 5,515,712 A | 5/1996 | Yunick | |

*Primary Examiner*—Eric S. McCall
(74) *Attorney, Agent, or Firm*—McKee, Voorhees & Sease, P.L.C.

(57) ABSTRACT

A portable dynamometer includes a frame, an axle rotatably mounted on the frame, and a flywheel secured to the axle. An endless loop drive mechanism connects the axle and the output shaft of the engine to be tested. A ring gear drivingly attaches to the axle and an automotive starter connects to the ring gear to start the axle and engine turning. Various position-adjustable mounting pad assemblies can be mounted on the frame to hold different sizes and types of engines. The whole dynamometer can be tipped on end to facilitate testing of engines with vertical output shafts. A caliper brake mounts on the frame and decelerates the flywheel. Other methods of warming up and loading the engine are also disclosed.

22 Claims, 10 Drawing Sheets

PORTABLE FLYWHEEL TEST ASSEMBLY

CROSS-REFERENCE TO RELATED APPLICATIONS

This application claims priority based upon United States Provisional Application Ser. No. 60/108,929, filed Nov. 16, 1998.

BACKGROUND OF THE INVENTION

The present invention relates to inertia flywheel assemblies of dynamometers used for testing of automotive drive train components, including motors and clutches.

A number of conventional automotive vehicle dynamometer systems are available to test automotive components. However, many of these systems are large and stationary. These large test assemblies must be connected to permanent sources of electricity and hydraulics to operate.

Portable dynamometer test assemblies have been devised to overcome the limitations of stationary test assemblies. However, even these portable test assemblies are limited in the number of different types of tests they can perform. Some portable dynamometer test assemblies must directly replace the final component in the vehicle's drive train in order to take the necessary measurements. This is not always desirable. Existing dynamometer test assemblies also cannot run tests on engines and clutches (clutch slip and engagement rpm) with substantially the same setup. A completely different test setup or massive changeover of the test stand is generally required for testing other components or variables in addition to the usual motor efficiency or performance tests. A relatively small, flexible and portable flywheel test stand or dynamometer would be very useful in testing small engines and clutches such as those found in go-karts and the like.

Therefore, a primary objective of the present invention is the provision of a portable flywheel assembly for a dynamometer which can be used to test the horsepower and torque of an engine.

Another objective of the present invention is the provision of a flywheel assembly for a dynamometer which is economical to manufacture, easily transportable, and simple to use.

Another objective of the present invention is the provision of a flywheel assembly for a dynamometer which is versatile and can be used in many applications with minimal changeover time.

Another objective of the present invention is the provision of a flywheel assembly for a dynamometer which can test components in a vertical or horizontal orientation.

Another objective of the present invention is the provision of a dynamometer that uses an automotive type starter to automatically start the engine to be tested in either direction of rotation by rotating the dynamometer axle, which is in turn connected to the output shaft of the engine.

Another objective of the present invention is the provision of a flywheel assembly for a dynamometer which can utilize standard data acquisition systems.

These and other objectives will become apparent from the drawings, as well as from the description and claims which follow.

SUMMARY OF THE INVENTION

This invention relates to a flywheel test assembly or dynamometer disposed on a portable table. An axle is rotatably supported in the table. The axle is drivingly connected with a sprocket hub assembly and a flywheel mounted thereon. A ring gear is mounted for rotation on the axle in spaced relation to the flywheel.

The unit to be tested mounts on a mounting plate which can be secured to the top or side of the table. An endless loop drive mechanism interconnects the axle and the engine being tested. A chain or belt drivingly connects a driven sprocket or pulley hub assembly with the unit to be tested. The sprocket or pulley hub assembly can be moved to various locations along the axle. The table can also be pivoted ninety degrees. These features allow the flywheel test assembly to easily adapt to and test units having either horizontal or vertical output shafts. Setup or changeover efforts are kept to a minimum.

The flywheel test assembly also utilizes an automotive-type starter system in which the starter motor engages a ring gear attached to the axle. Thus, when the starter motor turns the ring gear, the flywheel, the sprocket hub assembly, and therefore the engine are driven.

The flywheel test assembly of this invention is extremely flexible and allows drive train systems and components, including engines and clutches, to be tested using basically the same setup. Various measures of engine performance can be documented and plotted using computerized data acquisition equipment. Furthermore, various measures of clutch performance, such as any type of drive train system slippage, can be documented.

DETAILED DESCRIPTION OF THE PREFERRED EMBODIMENT

An automotive vehicle for the purposes of this invention is considered to be any self-powered vehicle and includes, but is not limited to, motorcycles, motor cars, trucks, go-karts, snowmobiles, all-terrain vehicles, water craft, aircraft, and scale models. The power plants of such vehicles can include, but are not restricted to, an internal combustion engine, an electric motor, a turbine, and/or a flywheel.

Figure 1:
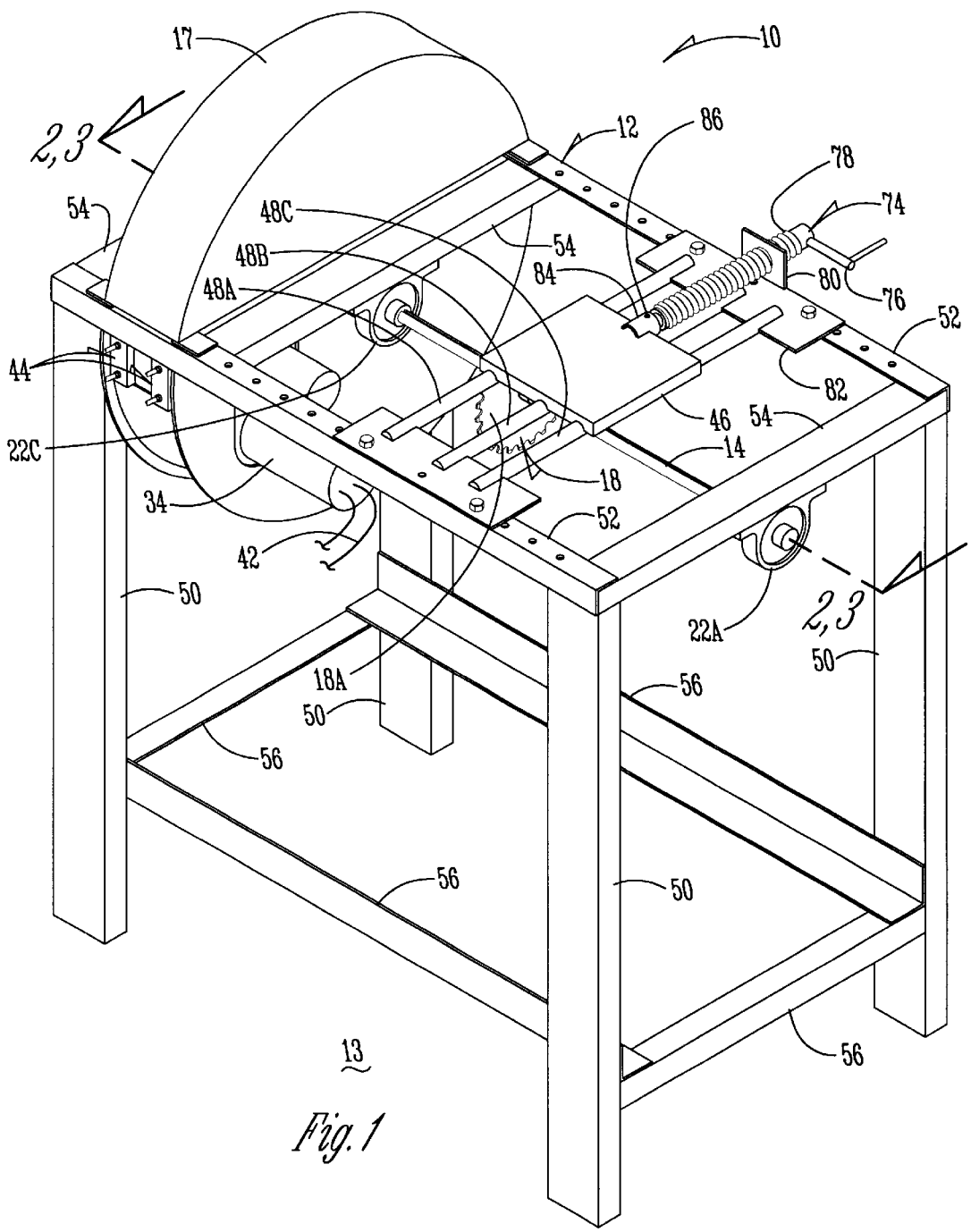
FIG. 1 is a perspective view of the portable dynamometer of this invention.
Figure 1A:
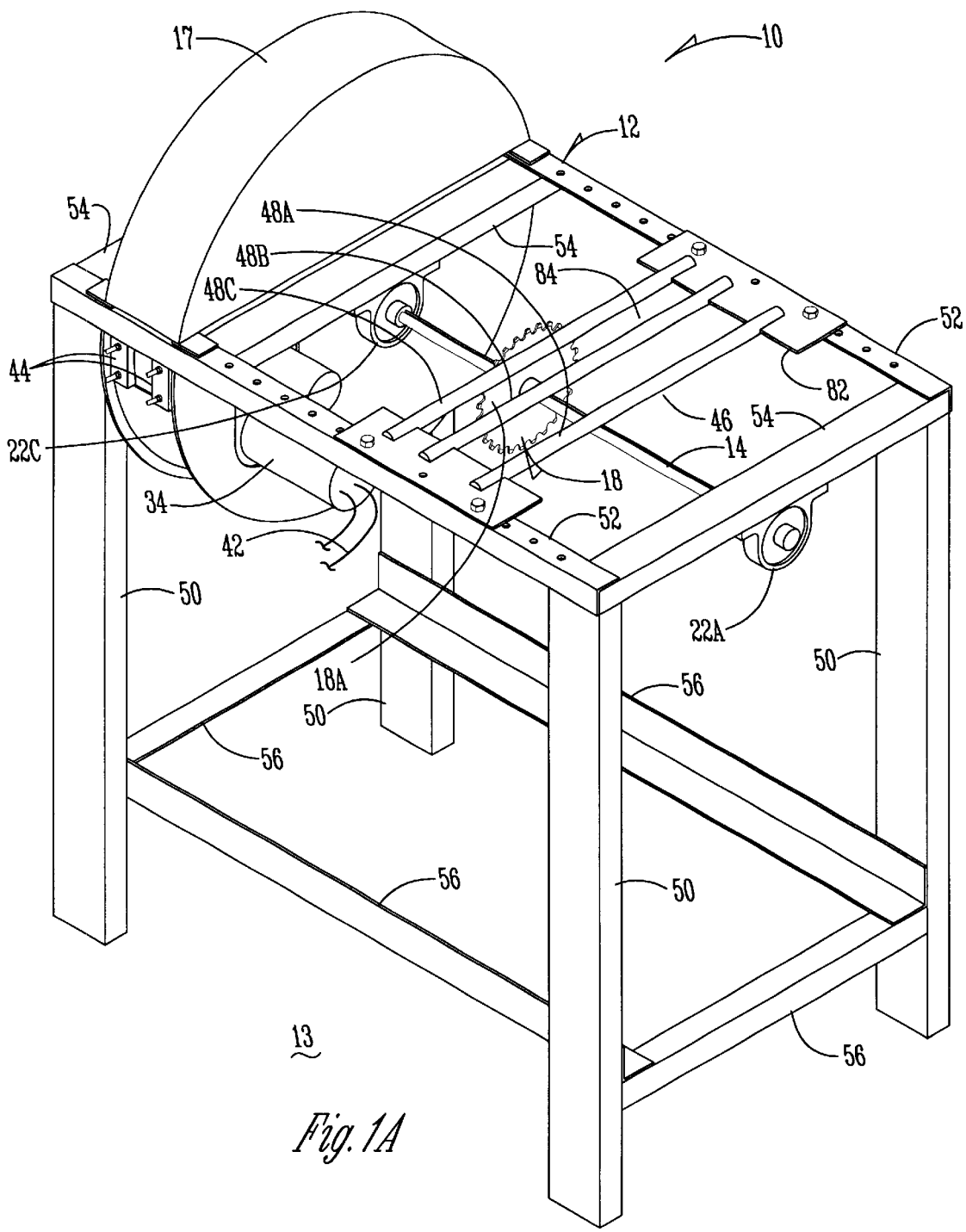
FIG. 1A is a perspective view similar to FIG. 1, but shows the mounting rack flipped over or rotated end-for-end.
Figure 2:
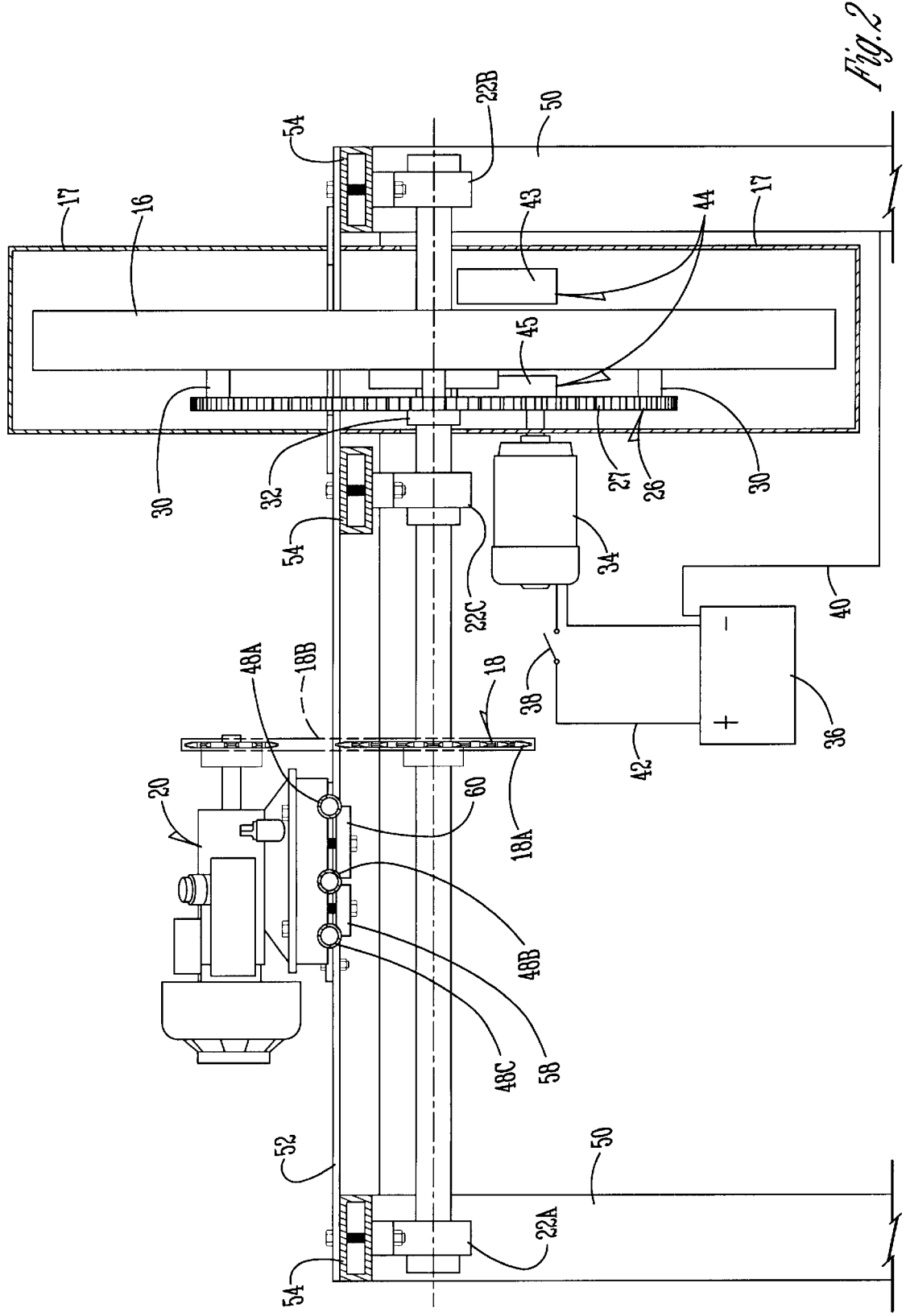
FIG. 2 is a sectional view of the dynamometer taken along line 2—2 in FIG. 1.
Figure 3:
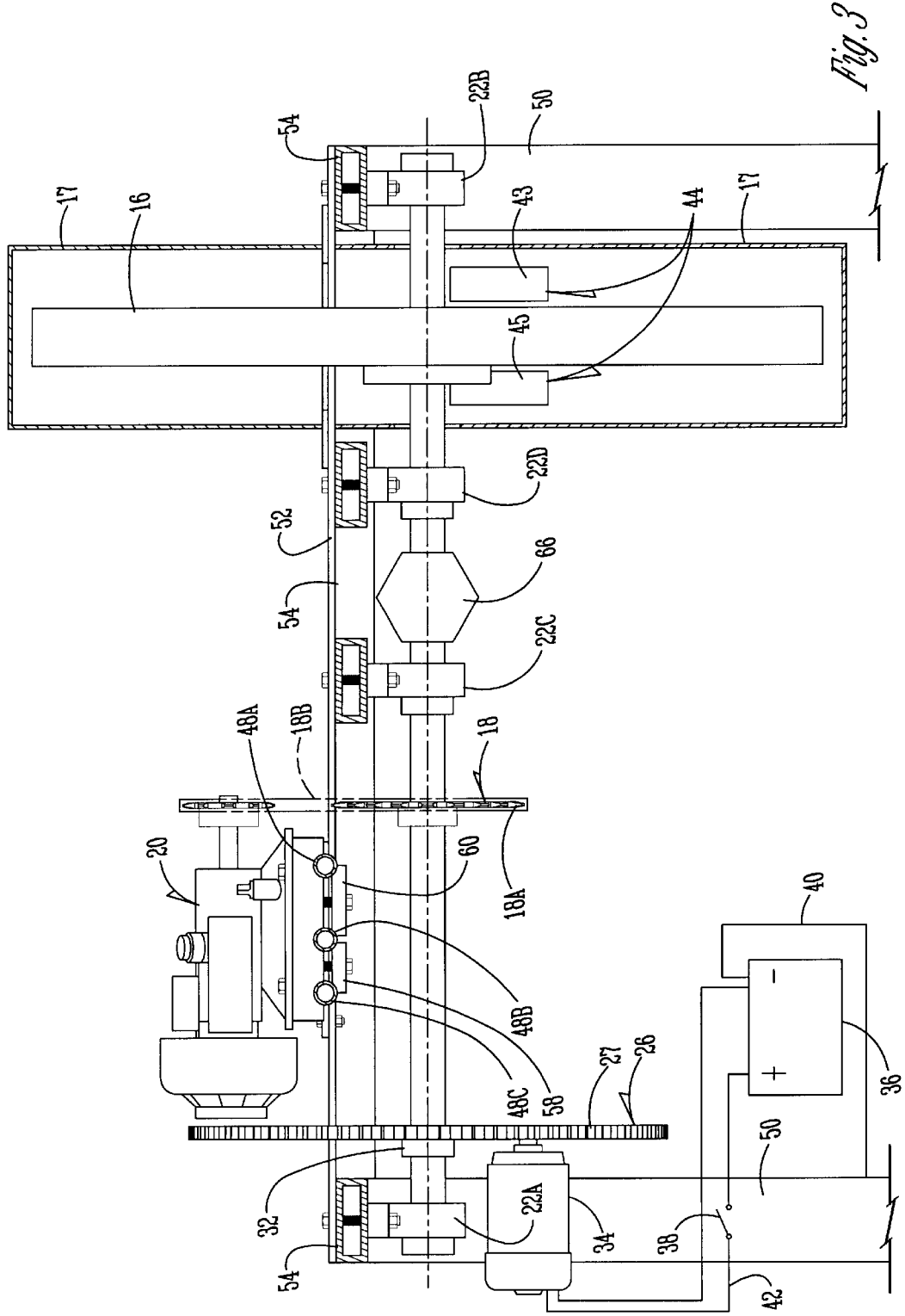
FIG. 3 is a sectional view taken along line 3—3 in FIG. 1 and is similar to FIG. 2, but shows an alternative embodiment wherein the dynamometer includes four bearings and a one-way clutch is interposed between the two innermost bearings.

In FIGS. 1–3, the major components of the inertial dynamometer flywheel test assembly 10 of this invention are shown. A table 12 sits on a support surface 13 and rotatably supports an axle 14. The axle 14 is drivingly connected to a flywheel 16. The position of the flywheel 16 on the axle 14 is slidably adjustable in the axial direction.

A sprocket hub assembly 18 is mounted for rotation with the axle 14. Like the flywheel 16, the sprocket hub assembly 18 is slidably adjustable in an axial direction. The sprocket hub assembly 18 includes a sprocket 18A or pulley wheel mounted on the axle 14. Assembly 18 and 18A can also be replaced with an axle clutch assembly. An appropriate endless loop means 18B, such as a chain or drive belt, drivingly connects the unit to be tested 20 to the sprocket hub assembly. See FIG. 2.

Referring again to the axle 14, spaced apart bearings 22A, 22B rotatably support each end with respect to the table 12. An additional bearing 22C is disposed between the sprocket hub assembly 18 and the flywheel 16, inwardly of the outer bearings 22A, 22B.

A flywheel starter ring gear assembly 26 comprises a ring gear 27 mounted on a support plate which is connected to the axle 14 by a centering hub 32. The hub 32 centers and supports the starter ring gear 27 and the support plate on the axle 14. A plurality of spacers 30 may interconnect the flywheel 16 and ring gear assembly 26, thus operatively mounting the flywheel 16 on the axle 14.

A starter motor 34 selectively drivingly engages the ring gear 27 to rotate the flywheel 16, the axle 14, and thereby the unit to be tested 20. The starter motor 34 selectively engages with the starter ring gear 27 when a key switch or solenoid 38 is activated. The switch could be an electrically activated switch or solenoid assembly. In the preferred embodiment, the test assembly 10 utilizes an automotive-type starting system. A battery 36 is grounded to the table 12 by a cable 40, and a positive cable 42 extends to the solenoid 38 and then to the starter motor 34. By reversing its polarity, the starter motor 34 can rotate the ring gear 27 (and thereby the output shaft of the engine 20) in either direction, as needed.

FIG. 2 shows that the unit to be tested 20 is a motor or engine mounted to the top of the table 12 with its horizontal output shaft extending toward the flywheel 16.

As best seen in FIGS. 1–3, a caliper brake 44 mounts on the table 12 adjacent the flywheel assembly 16. The caliper brake 44 is hydraulically operated and selectively engages the flywheel 16 to stop its rotation. The brake 44 can also load the engine 20 under test by decelerating the flywheel without completely stopping it. The caliper brake 44 includes brake pads 43, 45 arranged on either side of the flywheel 16 to frictionally engage it.

The unit to be tested 20 is secured and supported on a mounting plate 46. The mounting plate is slidingly supported by three rails 48A, 48B, 48C which extend generally perpendicular to the axle 14.

The table 12 has a plurality of normally upright legs 50 which support a pair of spaced apart longitudinal members 52 and a plurality of cross members 54 that interconnect the longitudinal members 52 as shown in FIG. 2. One or more reinforcing members 56 can optionally extend between the legs 50 to provide additional stability as shown in FIG. 1. For the sake of simplicity, the reinforcing members 56 have been omitted from the other figures.

As best seen in FIGS. 1–3, the mounting rails 48A, 48B, and 48C are spaced apart in a particular way. The distance between the center of rail 48B and 48C is approximately 3 inches. This spread corresponds to the American standard for motors 20 in the 0–40 horsepower range. An American motor mount wing member 58 threadedly engages the bottom of the motor mount plate 46 and engages or clamps against the lower side of the rails 48B and 48C to secure the plate 46 in the desired location. On the other hand, the distance between the centers of the rails 48A and 48B is approximately 3½ inches. This distance corresponds to the International motor mounting standards. An International motor mount wing member 60 threadedly engages or clamps against the underside of the plate 46 and the rails 48A, 48B to secure the plate 46 in the desired location. The center rail 48B is shared by both the International and American mounting systems.

Figure 6:
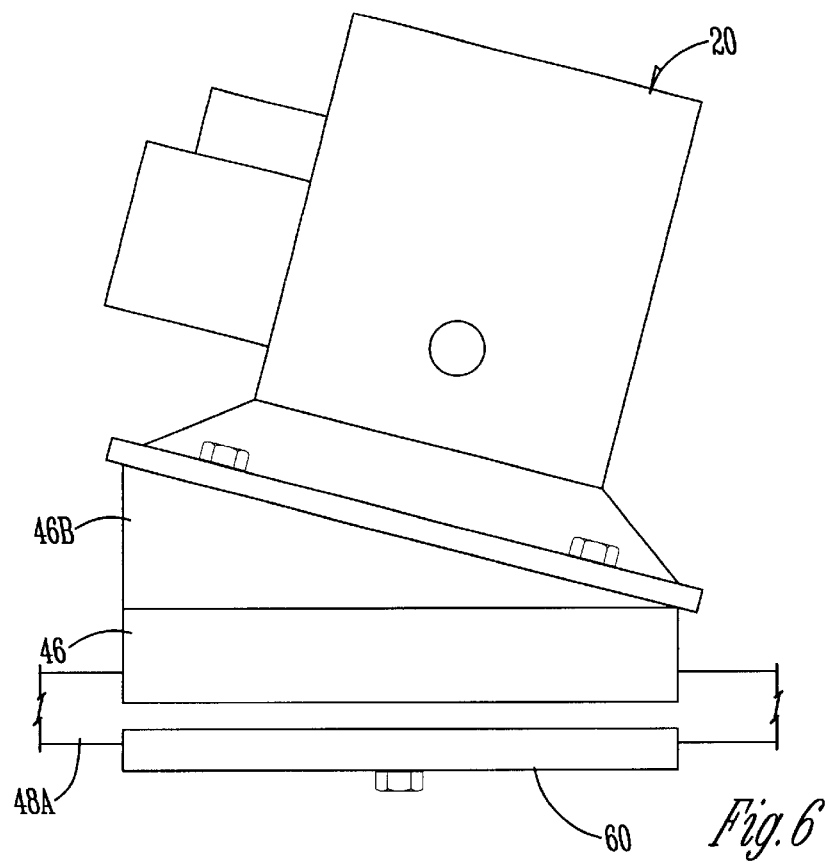
FIG. 6 is a partial end elevation view showing an engine having a horizontal output shaft mounted on a wedge attached to the mounting plate of the dynamometer so as to simulate the angled mounting conditions often found in go karts.

FIG. 6 illustrates another variation of the invention wherein a wedge-shaped motor mounting fixture 46B can be provided. This provides a standardized cart rail system, which is used worldwide for testing go-kart engines. The wedge 463 is angled because kart engines are generally mounted on the right rear frame rail and the fuel tank and carburetor must be elevated to clear the right rear tire.

In other applications a rectangular block-shaped mounting plate 46A is used. The mounting plate 46A is shown in greater detail in FIG. 4. The plate 46A is designed to be universal and hold a variety of different types of units to be tested 20. The mounting plate 46A has a round aperture 62 extending vertically therethrough for receiving the output shaft of the unit to be tested 20 when the output shaft is oriented vertically. The mounting plate 46A also has a plurality of perpendicular slots 64 which extend through the mounting plate 46A and radially outward from the aperture 62. The slots 64 allow the unit 20 to be secured to the mounting plate 46A by conventional fasteners. The elongated slots 64 provide adjustment and flexibility so as to allow accurate placement of the unit to be tested 20.

One skilled in the art can appreciate that a plurality of individual threaded mounting holes can be used instead of the aperture and slot configuration when the unit to be tested 20 is placed on the mounting plate 46 with its output shaft in a horizontal orientation, as shown in FIGS. 1–3. Most original equipment manufacturers for small engines use the same motor mount or bolt pattern so that their engines will be interchangeable and fit almost all equipment designed for that engine size. For example, vertical engines (sizes 8 horsepower to about 12.5 horsepower) will fit on almost all riding mowers. Plate 46 will be laser cut to accept most OEM bolt patterns so that most engines will bolt on very easily.

As best seen in FIG. 2, the bearing 22A is mounted to the underside of the left cross member 54. Meanwhile, a second bearing 22B is mounted to the underside of the right cross member 54. A third bearing 22C is mounted on the intermediate cross member 54 between the other bearings 22A, 22B. The bearing 22C is also interposed between the sprocket hub assembly 18 and the starter ring gear assembly 26. This arrangement rotatably supports the axle 14 at three or more spaced apart points along its length.

FIG. 3 shows another embodiment in which a fourth bearing 22D is mounted to one or more intermediate cross members 54. A one-way clutch or sprag-type bearing 66 is provided between the two intermediate bearings 22C and 22D. The one-way clutch 66 allows the flywheel 16 to be disengaged from the unit under test 20 should a catastrophic failure occur. In that event, the flywheel 16 will merely coast to a stop and therefore prevent further damage from being done to the engine, the drive system, or the test stand.

The bearings 22A, 22B, 22C, and 22D rotatably support the axle 14 with respect to the table 12. Preferably, these bearings 22A, 22B, 22C, 22D are of the cast pillow block style, but other styles of bearings can be used without detracting from the invention so long as they are durable, reliable and have sufficient load-bearing capacity.

FIG. 3 also shows that the starter ring gear assembly 26 and starter 34 can be located on the other side of the sprocket hub assembly 18, remote from the flywheel 16.

Conventional safety shields 17 are preferably installed so as to cover the flywheel 16. Additional shielding (not shown) is also desirable around the sprocket hub assembly 18 and the area around the chain or belt 18B.

The flywheel test assembly 10 can be provided with a computerized data acquisition system (not shown). Sensors for speed, temperature, and other variables of interest can be placed in operative proximity to the motor output shaft and the flywheel 16. Of course, any information that a data acquisition system or computer could collect through the sensors would be useful in analyzing any part of the engine 20 or the kart drive train system.

The present invention can best test motors or engines in the zero to 40 hp range, but it can also be adapted to larger engines. In operation, the flywheel test assembly 10 can test a motor or engine 20 with a horizontally disposed output shaft as follows. The motor 20 is removed from the vehicle and mounted on the mounting plate 46. The endless loop means 18B is connected to the output shaft, preferably by a sprocket or pulley mounted thereon. The sensors should be in place on the motor output shaft and the flywheel 16 or axle 14. Optional sensors could also measure fuel pump pressure, exhaust temperature, engine vacuum, or other system attributes. Once the setup of the test stand is completed, the ignition key switch 38 is activated to engage the starter ring gear assembly 26 with the starter motor 34. The starter motor 34 turns the starter ring gear assembly 26, which in turn rotates the axle 14 and the flywheel 16. The axle 14 starts the motor 20, turning with the sprocket hub drive assembly 18.

Figure 9:
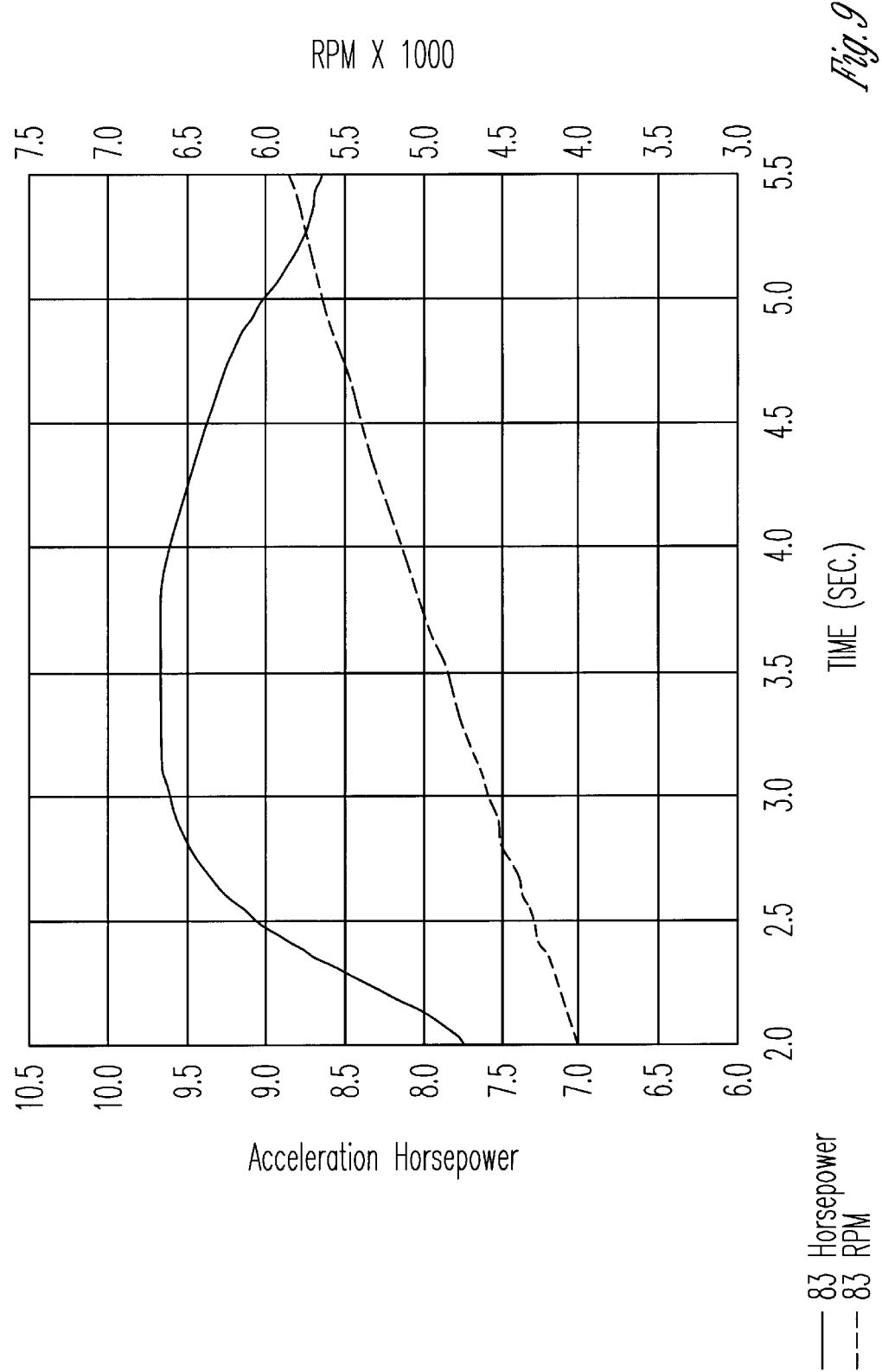
FIG. 9 is a graph of acceleration horsepower and rpm versus time in seconds from a performance test of a motor.

The versatility of the dynamometer 10 allows any number of ways to be used to warm up and or load the engine 20. The caliper brake 44 can frictionally engage the flywheel 16 to load the motor 20 and speed up the warm-up process. The flywheel itself acts as the rotor for the brake 44. Once warm-up has been achieved, plots of acceleration horsepower and engine rpm versus time (in seconds) can be generated by quickly and steadily increasing the engine rpm from a low value to a high value. FIG. 9 shows a typical plot.

Figure 4:
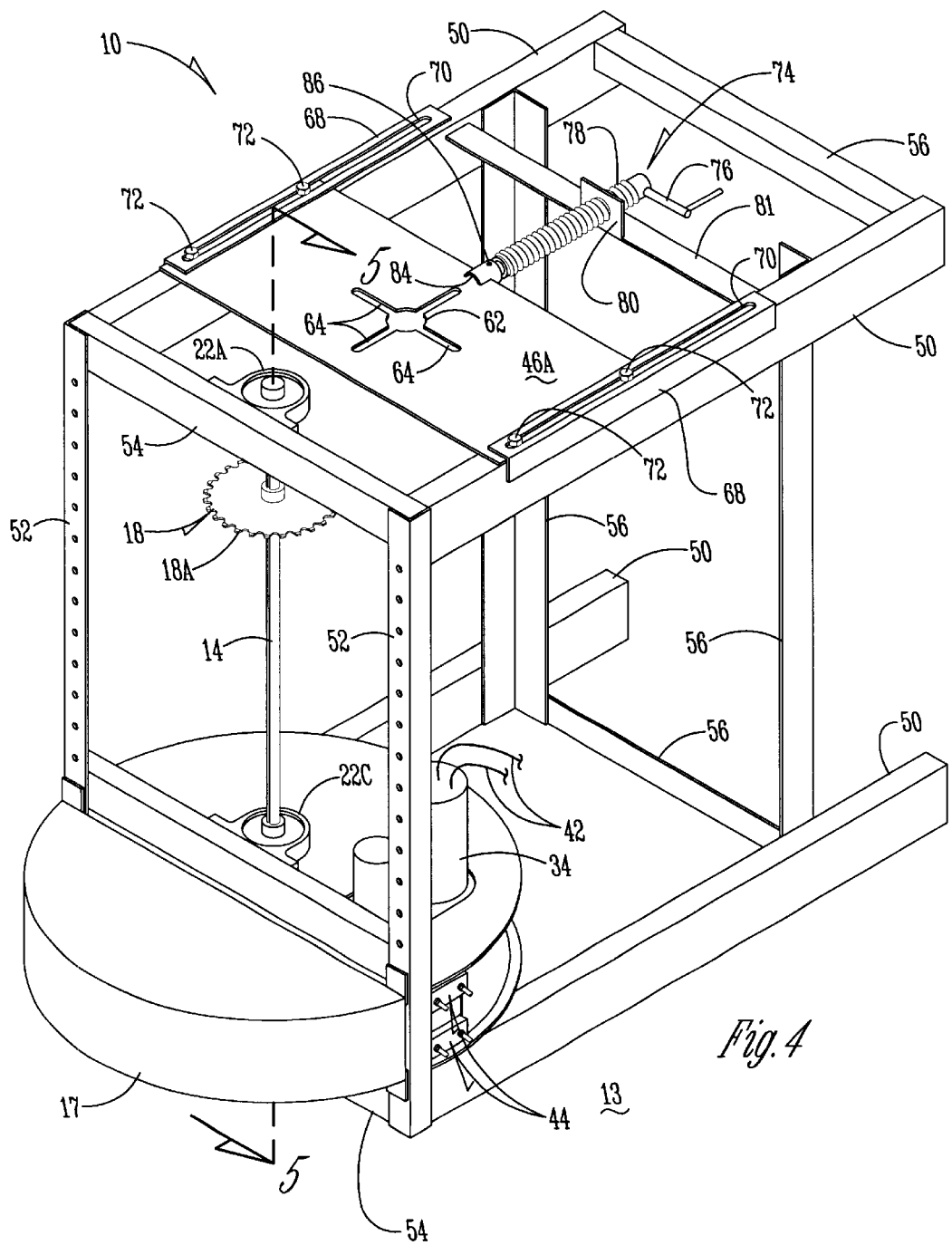
FIG. 4 is a perspective view of the dynamometer of this invention tipped over on its end and configured to test an engine with a vertical output shaft.
Figure 5:
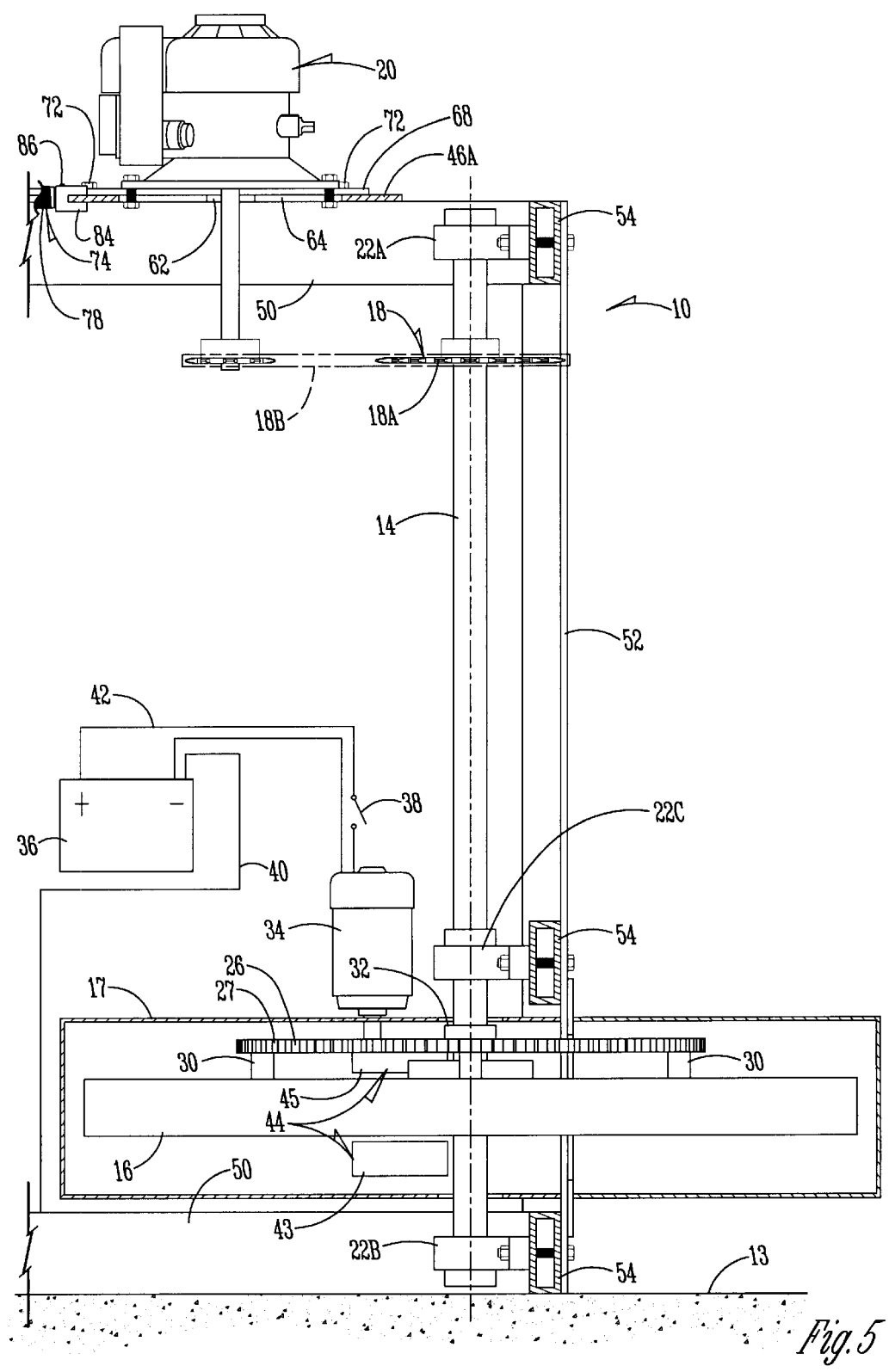
FIG. 5 is a sectional view of the dynamometer taken along line 5—5 in FIG. 4.

The changeover or conversion of the flywheel test assembly 10 from a configuration capable of testing engines 20 with horizontal output shafts to a configuration capable of testing engines 20 with vertical output shafts is quite simple. As best seen in FIGS. 4 and 5, the flywheel test assembly 10 is merely rotated 90 degrees so that the legs 50 remote from the flywheel 16 become the top of the table 12. The legs 50 adjacent the flywheel 16 then rest on the floor or supporting surface 13. The sprocket hub drive assembly 18 is moved along the axle 14 to a position where it is engageable with the output shaft of the engine 20. Of course, a mounting plate 46A can be provided on the upper legs 50. FIG. 4 shows the mounting plate 46A secured to the legs 50 for testing a vertical shaft engine 20.

An elongated member 68 having a J-shaped cross-section rigidly mounts to the legs 50 so as to form a channel for slidingly receiving the edge of the mounting plate 46A. The mounting plate 46A has threaded holes adjacent each of its corners. The elongated J-shaped members 68 have an elongated slot 70 therein that accommodates the shanks of screws 72, which are inserted into the holes in the mounting plate 46A. Thus, the mounting plate 46A can be slidably positioned in the channels between the legs 50 and the J-shaped elongated member 68.

The mechanism 74 for adjusting the position of the mounting bracket or plate 46, 46A is most clearly shown in FIG. 4, but is also generally shown in FIG. 1. The mechanism 74 enables quick and accurate adjustment of the tension on the endless loop chain or belt 18B. The mechanism includes a crank arm 76 that drivingly connects to a rod 78 having coarse Acme threads thereon. The rod 78 extends through a threaded hole in a member 80 that is fixed on the legs 50 (FIG. 4) or fixed to the plate 82 at the end of the mounting rails 48A, 48B, 48C (FIG. 1). The end of the rod 78 opposite the crank arm 76 has no threads and extends through a bore in the end of a hollow coupling member 84 that is fixed, preferably welded to the mounting plate 46, 46A as shown. A pin locked in place by a set screw 86 extends into the coupling member 84 and engages an annular groove in the rod 78 so that the plate 46, 46A moves with the rod 78 in both directions, but the rod 78 rotates freely in the coupling member 84.

Figure 10:
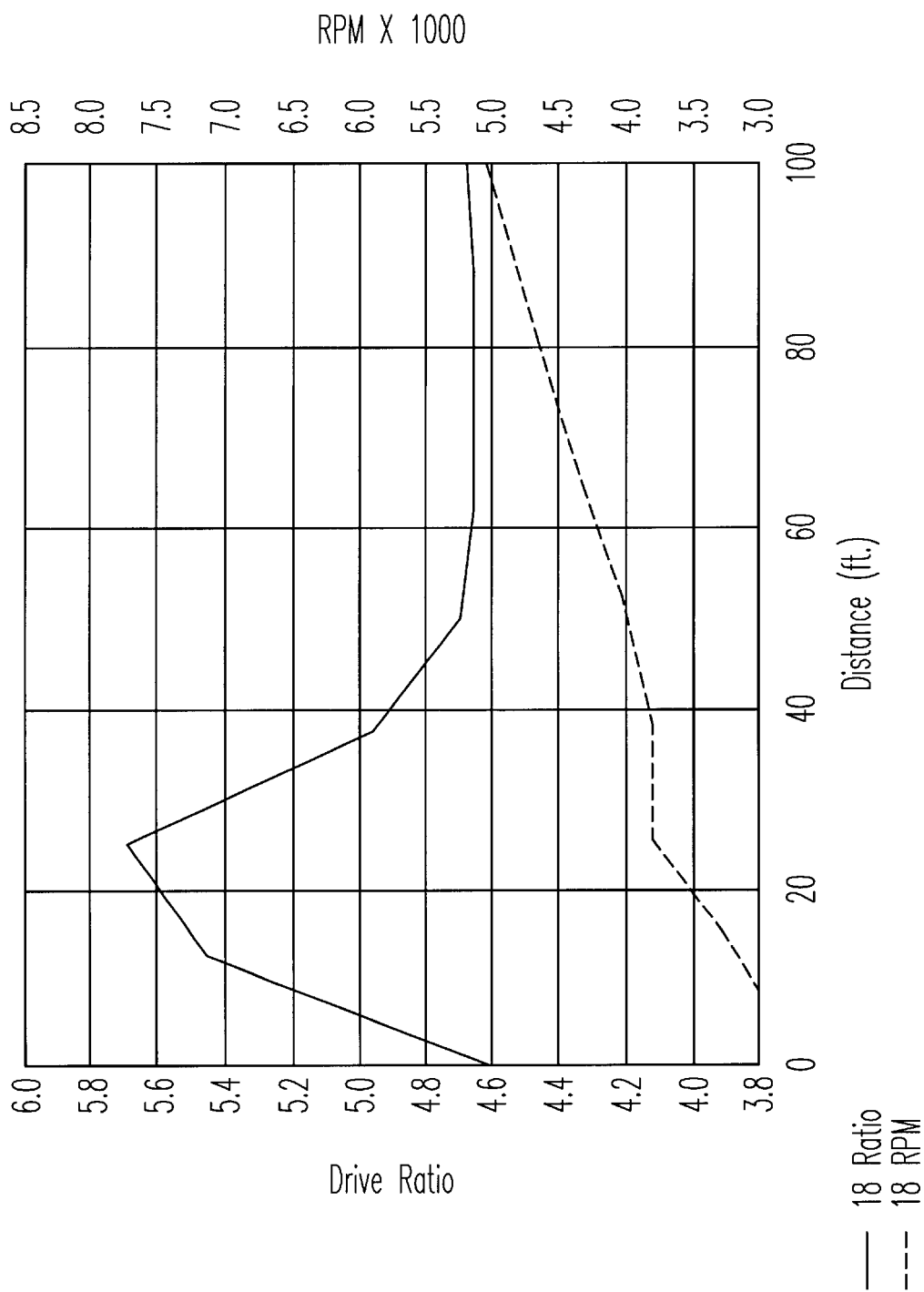
FIG. 10 is a graph of the drive ratio and engine rpm versus distance in feet resulting from clutch slip.

Various drive train components can be tested on the dynamometer of this invention. One such component is a clutch on an engine 20. The clutch slippage, expressed as a distance in feet, can be plotted versus engine rpm and drive ratio, as shown in FIG. 10.

As previously discussed, the placement of a one-way clutch 66 between the sprocket hub assembly 18 and the flywheel 16 on the axle 14 helps prevent damage in the event of engine failure. The one-way clutch 66 operatively disengages one portion of the axle 14 from the other portion of the axle 14 so that the flywheel 16 can coast freely to a stop. See FIG. 3.

Figure 7:
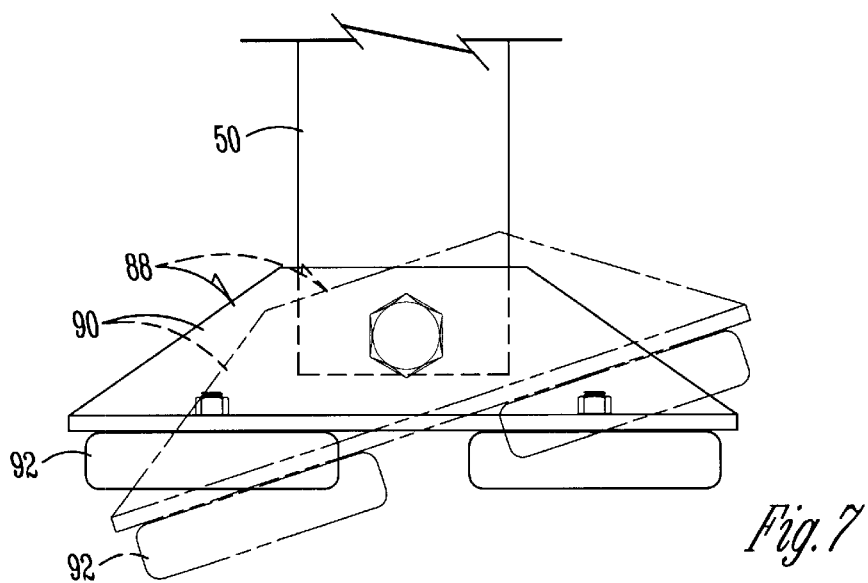
FIG. 7 is a partial side elevation view of the lower portion of one of the dynamometer table legs and shows how an optional bumper pad assembly pivotally mounts to the legs.

In FIG. 7, an optional floor-gripping end for the legs 50 is shown. The floor-gripping bumper assembly 88 includes an L-shaped bracket 90 that is pivotally mounted to the lower end of the leg 50. One or more resilient rubber pads 92 are rigidly fastened to the bottom of the bracket 90. The pads 92 frictionally engage the supporting surface 13 and thereby help keep the dynamometer in place during operation. The pads 92 also assist in dampening vibrations.

Figure 8:
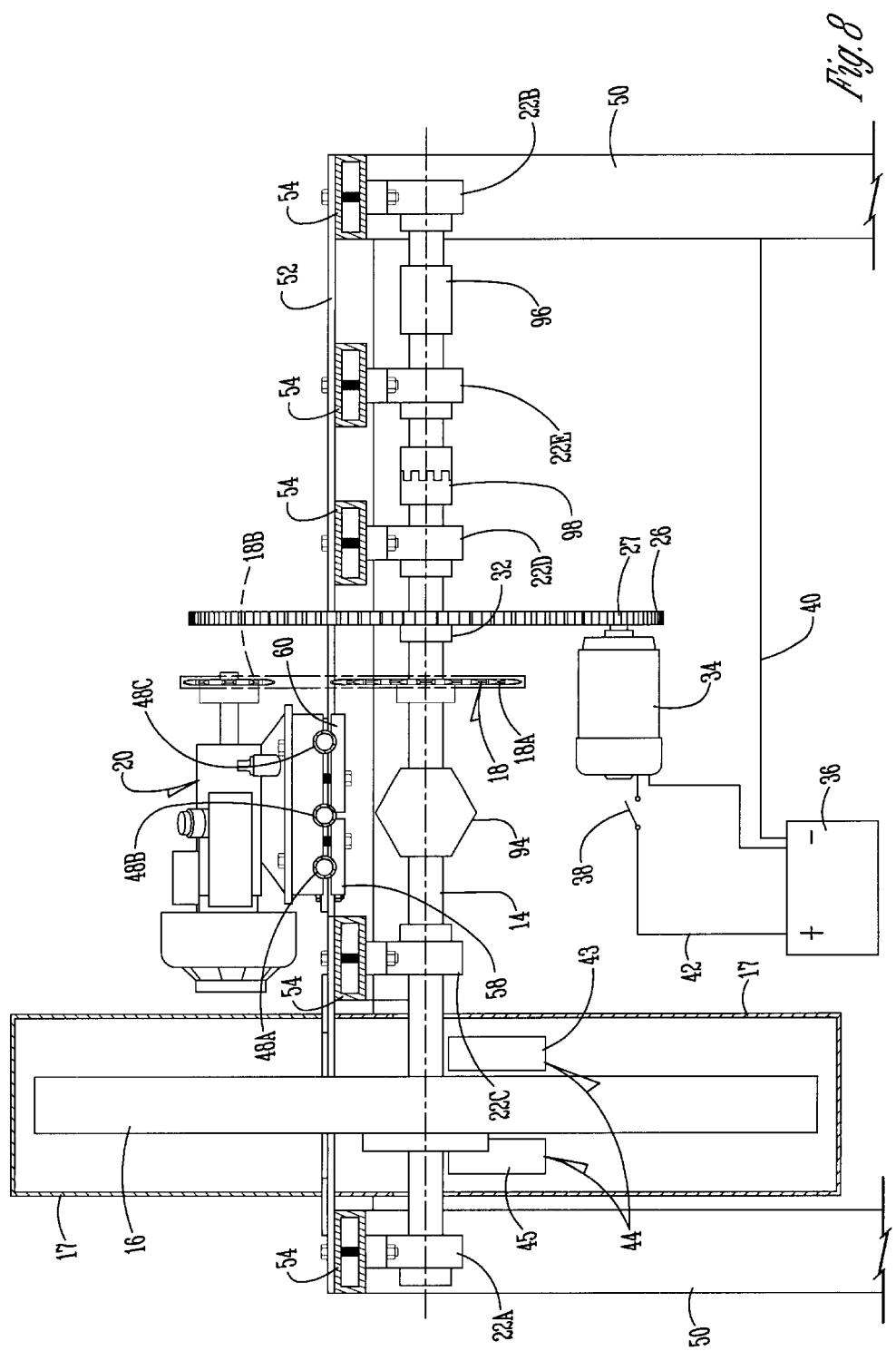
FIG. 8 is a sectional view similar to FIG. 2, but shows an alternative arrangement for warming up or loading the engine.

Other alternatives can be utilized to load or warm up the engine 20 or associated kart drive train components. The caliper brake can be supplemented or even replaced altogether by a hydraulic load circuit, a water brake system, or an electrical load circuit Thus, the engine 20 or other kart drive train components can be tested at an exact desired operating temperature or the load on the engine can be varied to determine its effect on the failure rate of the component. For example, FIG. 8 shows an embodiment in which the dynamometer includes a clutch 94 that selectively disconnects the flywheel 16 from the axle 14. An additional bearing 22E rotatably supports the axle 14. The alternative loading means 96, such as described above and illustrated by the "black box" in FIG. 8, is operatively attached to the portion of the axle 114 that remains connected to the engine 20. A Lovejoy coupling or another clutch 98 connects the alternate loading/warm-up means 96 to the ring gear assembly 26 and the engine 20. Thin arrangement provides a means of warming up the engine 20 without having to overcome the high inertia of the flywheel 16 at startup. For startup, the warm-up load can be kept to a minimum Then the load can be gradually increased to raise the temperature of the engine 20. The clutch 94 connects the flywheel 16 to the engine when the desired temperature has been reached.

Thus, it can be seen that the present invention at least achieves its stated objectives.

In the drawings and specification there has been set forth preferred embodiments of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the scope of the following claims.

What is claimed is:

1. A dynamometer for testing an engine having an output shaft comprising:
   a table frame including a pair of spaced elongated top frame rails together defining a table top, a pair of cross members interconnecting the top frame rails, and a plurality of upright legs extending downward from the top frame rails to support the table top;
   flywheel drive axle rotatably mounted to the cross members below the table top and disposed between all of the legs;
   a flywheel having a central axis of rotation and being coaxially secured to the flywheel drive axle at a location between all of the legs so as to rotate therewith, a substantial portion of the flywheel extending above the table top;
   an engine mounting pad assembly position-adjustably mounted on top of the top frame rails; and
   endless loop means associated with the flywheel drive axle at a location disposed between the top rails and all of the legs for drivingly and non-coaxially connecting the flywheel drive axle to an output shaft of an engine to be tested.

2. The dynamometer of claim 1 wherein the mounting pad assembly includes an elongated mounting rack detachably mounted to the frame rails so as to extend transversely therebetween in one of a plurality of locations along the frame rails.

3. The dynamometer of claim 2 wherein the mounting rack has opposite ends, a top, and a bottom, the mounting rack being reversibly orientable and mountable such that in a first orientation of the mounting rack the top is directed away from the Same rails and in a second orientation the top is directed toward the frame rails.

4. The dynamometer of claim 2 wherein the mounting rack includes a first elongated mounting bar, a second elongated mounting bar, and a third elongated mounting bar, the first mounting bar and the second mounting bar being spaced closer together than the second mounting bar and the third mounting bar.

5. The dynamometer of claim 4 wherein the mounting bars are identical radially spaced cylindrical bars that extend substantially horizontally, parallel to each other, and perpendicular to the axle.

6. The dynamometer of claims 1 comprising a battery, a ring gear drivingly secured to the axle, and an electric automotive starter mounted on the fame adjacent the ring gear and connected to the battery by a switch the starter selectively engaging the ring gear when the switch is closed and thereby rotating the ring gear and the axle.

7. The dynamometer of claim 1 wherein the endless loop means includes a sprocket on the axle and an endless loop chain engaging the sprocket on the axle.

8. The dynamometer of claim 7 wherein the sprocket on the axle is releasably secured to the axle and is selectively slidable longitudinally along the axle.

9. The dynamometer of claim 6 wherein the ring gear has a plurality of teeth arranged circumferentially thereon and the starter has a selectively extensible output gear with a plurality of teeth thereon for engaging the teeth of the ring gear when the switch is closed.

10. The dynamometer of claim 6 wherein the ring gear and the flywheel are axially spaced along the axle and rigidly connected to each other in addition to being connected to the axle.

11. The dynamometer of claim 7 wherein a one-way clutch is interposed between the sprocket and the flywheel.

12. The dynamometer of claim 1 comprising a brake mounted on the frame for selectively decelerating the flywheel by contacting the flywheel such that the flywheel itself acts as a rotor for the brake.

13. The dynamometer of claim 12 wherein the flywheel is secured to the axle between the frame rails, the brake being mounted on the frame rails adjacent the flywheel.

14. The dynamometer of claim 12 wherein the brake is a hydraulically operated caliper brake.

15. The dynamometer of claim 14 wherein the flywheel has opposite axially spaced first and second side surfaces, the caliper brake having a first brake pad for selectively engaging the first side surface of the flywheel and a second brake pad opposing the first brake pad for selectively engaging the second side surface of the flywheel.

16. A dynamometer for testing an engine having an output shaft comprising
   a frame having legs connected to a pair of elongated frame rails and at least one cross member interconnecting the frame rails,
   a flywheel drive axle rotatably mounted on the frame;
   means for drivingly connecting the output shaft of the engine to the axle;
   a flywheel secured to the axle so as to rotate therewith;
   an engine mounting pad assembly position-adjustably mounted on the frame for detachably securing the engine to the frame;
   wherein the mounting pad assembly includes a top mounting plate positioned over the mounting bars and means extending below the mounting bars for selectively clamping the top mounting plate to the bars in a desired position along the bars.

17. The dynamometer of claim 16 wherein the means for selectively clamping the top plate to the mounting bars includes a bottom wing plate positioned below the mounting bars and threaded fastening means for interconnecting and drawing the top and bottom plates toward each other.

18. A dynamometer for testing an engine having an output shaft comprising:
   a frame having legs connected to a pair of elongated frame rails and at least one cross member interconnecting the frame rails;
   a flywheel drive axle rotatably mounted on the frame;
   means for drivingly connecting the output shaft of the engine to the axle;
   a flywheel secured to the axle so as to rotate therewith;
   an engine mounting pad assembly position-adjustably mounted on the fame for detachably securing the engine to the frame;
   wherein the mounting pad assembly includes a mounting plate slidably mounted to an adjacent pair of the legs so as to extend therebetween; and wherein an elongated member having a J-shaped cross-section is rigidly mounted respectively to each leg of the pair of legs so as to form a channel between the J-shaped member land the leg for slidably receiving an edge of the mounting plate.

19. The dynamometer of claim 18 wherein the mounting plate has an aperture therein and four elongated slots that extend through the plate and extend radially outward from the aperture, the slots being spaced ninety degrees apart.

20. A dynamometer for testing an engine having an output shaft comprising:
   a frame having legs connected to a pair of elongated frame rails and at least one cross member interconnecting the frame rails;
   a flywheel drive axle rotatably mounted too the frame;
   means for drivingly connecting the output shaft of the engine to the axle;
   a flywheel secured to the axle so as to rotate therewith;
   an engine mounting pad assembly position-adjustably mounted too the frame for detachably securing the engine to the frame;
   mounting plate slidably mounted to an adjacent pair of the legs so as to extend therebetween and slide longitudinally therealong.

21. A portable dynamometer for testing an engine having an output shaft comprising a battery;
   a table frame including a plurality of legs supporting a table top with a mounting bracket thereon for mounting the engine to be tested;
   a flywheel axle rotatably mounted to the frame below the table top;
   a flywheel secured to the axle for rotation therewith at a location on the frame remote from the engine to be tested;
   a ring gear secured to the axle for rotation therewith at a location on the frame remote from the engine to be tested;
   an electric automotive starter mounted on the frame adjacent the ring gear and connected to the battery by a switch, the starter selectively engaging the ring gear when the switch is closed so as to rotate the ring gear and thereby the axle;
   endless loop means for drivingly connecting the axle with the output shaft of the engine to be tested in a non-coaxial manner.

22. A dynamometer for testing an engine having an output shaft comprising:
   a frame having legs connected to a pair of elongated frame rails and at least one cross member interconnecting the frame rails;
   a flywheel drive axle rotatably mounted on the frame;
   means for drivingly connecting the output shaft of the engine to the axle;
   a flywheel secured to the axle so as to rotate therewith;
   an engine mounting pad assembly position-adjustably mounted on the frame for detachably securing the engine to the frame;
      wherein the mounting pad includes a first elongated mounting bar, a second elongated mounting bar, and a third elongated mounting bar, the first mounting bar and the second mounting bar being spaced closer together than the second mounting bar and the third mounting bar; and
      the first, second and third mounting bars being parallel to each other and each having a central longitudinal axis disposed in a common plane, the central longitudinal axis of the first mounting bar being spaced approximately three inches in one direction from the central longitudinal axis of the second mounting bar, the central longitudinal axis of the third mounting bar being spaced approximately 3.5 inches from the central longitudinal axis of the second mounting bar in another direction.

* * * * *